US009399466B2

(12) United States Patent
Cueppers

(10) Patent No.: US 9,399,466 B2
(45) Date of Patent: Jul. 26, 2016

(54) METHOD FOR OPERATING AN AUTOMATIC TRANSMISSION

(71) Applicant: ZF Friedrichshafen AG, Friedrichshafen (DE)

(72) Inventor: Ruben Cueppers, Wangen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/512,516

(22) Filed: Oct. 13, 2014

(65) Prior Publication Data
US 2016/0101781 A1    Apr. 14, 2016

(51) Int. Cl.
*G06F 17/00* (2006.01)
*B60W 30/19* (2012.01)
*B60W 30/18* (2012.01)
*B60W 10/11* (2012.01)
*B60W 10/02* (2006.01)
*B60W 10/04* (2006.01)

(52) U.S. Cl.
CPC .............. *B60W 30/19* (2013.01); *B60W 10/02* (2013.01); *B60W 10/04* (2013.01); *B60W 10/11* (2013.01); *B60W 30/18018* (2013.01); *B60W 2520/10* (2013.01); *B60W 2710/023* (2013.01); *B60W 2710/06* (2013.01); *B60W 2710/1005* (2013.01)

(58) Field of Classification Search
None
See application file for complete search history.

(56) References Cited

U.S. PATENT DOCUMENTS

| | | | | |
|---|---|---|---|---|
| 4,380,278 A * | 4/1983 | Lasken | ................. | F16D 48/062 192/3.58 |
| 4,735,109 A * | 4/1988 | Richards | ................. | F16H 3/095 74/331 |
| 5,046,175 A * | 9/1991 | Lentz | .................... | F16H 61/061 477/143 |
| 5,157,607 A * | 10/1992 | Stainton | ................. | F16H 61/12 701/62 |
| 5,441,463 A * | 8/1995 | Steeby | .................... | F16H 61/12 477/79 |
| 5,537,894 A * | 7/1996 | Chan | ....................... | F16H 61/12 477/78 |
| 5,650,932 A * | 7/1997 | Chan | ....................... | F16H 61/12 477/115 |
| 5,873,281 A * | 2/1999 | Stasik | ................... | B60W 10/02 477/124 |
| 9,096,219 B2 * | 8/2015 | Okuwaki | ............... | B60K 6/445 |

* cited by examiner

Primary Examiner — Dirk Wright
(74) Attorney, Agent, or Firm — Dority & Manning, P.A.

(57) ABSTRACT

A method for operating an automatic transmission is provided. The method includes commanding a positive shifting element to actuate to a disengaged configuration or an engaged configuration and opening at least one non-positive shifting element if the positive shifting element does not properly actuate. Opening the at least one non-positive shifting element may terminate power flow from the automatic transmission in order to protect the automatic transmission.

10 Claims, 3 Drawing Sheets

| | A | B | C | D | E | F |
|---|---|---|---|---|---|---|
| 1 | X | --- | --- | X | --- | X |
| 2 | X | --- | X | --- | --- | X |
| 3 | X | X | --- | --- | --- | X |
| 4 | X | --- | --- | --- | X | X |
| 5 | X | X | --- | --- | X | --- |
| 6 | X | --- | X | --- | X | --- |
| 7 | X | --- | --- | X | X | --- |
| 8 | --- | --- | X | X | X | --- |
| 9 | --- | X | --- | X | X | --- |
| EXTENDED NEUTRAL A/F CLOSED | X | --- | --- | --- | --- | X |
| EXTENDED NEUTRAL A/F OPEN | --- | --- | --- | --- | --- | --- |
| EXTENDED NEUTRAL A OPEN, F CLOSED | --- | --- | --- | --- | --- | X |
| R | --- | X | --- | X | --- | X |

METHOD FOR OPERATING AN AUTOMATIC TRANSMISSION

FIELD OF THE INVENTION

The present subject matter relates generally to automatic transmissions, such as nine-speed automatic transmissions.

BACKGROUND OF THE INVENTION

Automatic transmissions generally include at least one planetary gear set and a plurality of shift elements. The shift elements selectively engage components of the planetary gear sets in order to hinder or prevent rotation of the components. Selective actuation of the shift elements adjusts the gear ratio of the automatic transmission and shifts the automatic transmission between its various gears.

Proper actuation of the shift elements provides smooth shifting between gears and improves performance of the automatic transmission. Thus, shift elements preferably adjust between engaged states and disengaged states in a reliable manner. However, shift elements can fail to adjust between the engaged and disengaged states for a variety of reasons. For example, splines of a shifting element may lock together and hold the shifting element in the engaged state. If a shift elements sticks or does not operate properly, performance of the automatic transmission can be negatively affected. For example, if a shift element sticks in an engaged configuration, the automatic transmission can be overdetermined in gears that do not require the shift element.

Accordingly, a method for operating an automatic transmission that assists with limiting or preventing damage to the automatic transmission when a shifting element of the automatic transmission is not functioning properly would be useful. In particular, a method for operating an automatic transmission that avoids or prevents overdetermining the automatic transmission would be useful.

BRIEF DESCRIPTION OF THE INVENTION

The present subject matter provides a method for operating an automatic transmission. The method includes commanding a positive shifting element to actuate to a disengaged configuration or an engaged configuration and opening at least one non-positive shifting element if the positive shifting element does not properly actuate. Opening the at least one non-positive shifting element may terminate power flow from the automatic transmission in order to protect the automatic transmission. Additional aspects and advantages of the invention will be set forth in part in the following description, or may be apparent from the description, or may be learned through practice of the invention.

In a first exemplary embodiment, a method for operating an automatic transmission is provided. The automatic transmission has a plurality of non-positive shifting elements and at least one positive shifting element. The method includes commanding a first one of the at least one positive shifting element to actuate from a disengaged configuration to an engaged configuration, measuring a speed differential of a first one of the at least one positive shifting element during the step of commanding, and opening at least one non-positive shifting element of the plurality of non-positive shifting elements if the speed differential exceeds a speed differential limit during the step of measuring.

In a second exemplary embodiment, a method for operating an automatic transmission is provided. The automatic transmission has a plurality of non-positive shifting elements and at least one positive shifting element. The method includes commanding a first one of the at least one positive shifting element to actuate from an engaged configuration to a disengaged configuration, determining a position of the first one of the at least one positive shifting element during the step of commanding, and opening at least one non-positive shifting element of the plurality of non-positive shifting elements if the position of the first one of the at least one positive shifting element does not reach an open position during the step of measuring.

In a third exemplary embodiment, a method for operating an automatic transmission in a start-stop mode is provided. The automatic transmission has a plurality of non-positive shifting elements and at least one positive shifting element. The method includes deactivating an engine of a vehicle when the vehicle comes to a stop, opening at least one non-positive shifting element of the plurality of non-positive shifting elements at the step of deactivating, keeping the at least one positive shifting element in an engaged configuration during the step of deactivating, activating the engine of the vehicle after the step of deactivating, and closing the at least one non-positive shifting element of the plurality of non-positive shifting elements at the step of activating.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figures 1, 2:
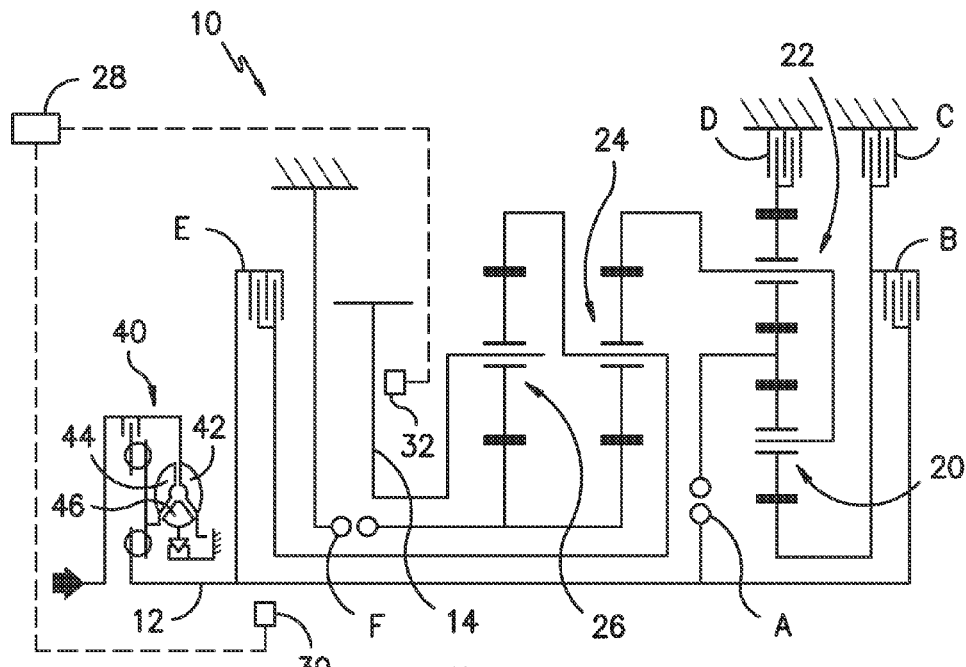
FIG. 1 provides a schematic view of an automatic transmission according to an exemplary embodiment of the present subject matter.
FIG. 2 illustrates a table of an exemplary shifting scheme as may be used with the exemplary automatic transmission of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of an automatic transmission 10 according to an exemplary embodiment of the present subject matter. Automatic transmission 10 may be constructed or arranged in a similar manner to the automatic transmission described in U.S. Pat. No. 8,398,522 to Bauknecht et al., which is hereby incorporated by reference for all purposes. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10, as will be understood by those skilled in the art, in order to provide a suitable mechanical advantage to propel the associated vehicle.

As may be seen in FIG. 1, automatic transmission 10 includes an input shaft 12 and an output shaft 14. Automatic transmission 10 also includes a torque converter 40 with an impeller 42, a turbine 44 and a stator 46. Torque converter 40 may couple automatic transmission 10 to a motor of an associated vehicle. In particular, input shaft 12 may be coupled to turbine 44 of torque converter 40, and the motor may rotate impeller 42 relative to turbine 44 in order to urge or induce rotation of turbine 44 with oil flow between impeller 42 and turbine 44. In such a manner, torque converter 40 may couple an engine to automatic transmission 10 such that input shaft 12 is rotatable with the motor. Stator 46 may redirect oil flow from turbine 44 towards impeller 42 in order to improve performance of torque converter 40, as will be understood by those skilled in the art. Torque converter 40 may also include a one-way clutch to further improve performance of torque converter 40. Output shaft 14 may be coupled a front axle drive shaft of the associated vehicle. Automatic transmission 10 may change gears in order to adjust the gear ratio between the motor and front axle drive shaft of the associated vehicle, as will be understood by those skilled in the art.

Automatic transmission 10 also includes four planetary gear sets: a first planetary gear set 20; a second planetary gear set 22; a third planetary gear set 24 and a fourth planetary gear set 26. In certain exemplary embodiments, as shown in FIG. 1, third and fourth planetary gear sets 24, 26 may be a Simpson planetary gear set, e.g., such that third and fourth planetary gear sets 24, 26 share a joint sun gear or sun gears of third and fourth planetary gear sets 24, 26 are coupled or fixed together. The sun gear of second planetary gear set 22 may also constitute the ring gear of first planetary gear set 20, and planet gears of first and second planetary gear sets 20, 22 may be mounted to a joint planet carrier that is also coupled or fixedly connected to the ring gear of third planetary gear set 24. The planet carrier of third planetary gear set 24 may also be coupled or fixedly connected to the ring gear of fourth planetary gear set 26.

As may be seen in FIG. 1, automatic transmission 10 further includes a plurality of shifting elements. In particular, automatic transmission 10 includes a plurality of non-positive shift elements and at least one positive shifting element. The non-positive shift elements may be any suitable type of non-positive shift elements. For example, the non-positive shift elements may be multidisc friction shift elements or friction bands. In the exemplary embodiment of FIG. 1, the non-positive shifting elements includes a multidisc clutch B, a multidisc brake C, a multidisc brake D and a multidisc clutch E. The positive shifting elements may also be any suitable type of positive shifting elements, e.g., that provide a form fit or torque proof connection. For example, the positive shifting elements may be dog clutches, dog brakes or claw clutches. In the exemplary embodiment of FIG. 1, the at least one positive shifting element includes a dog clutch A and a dog clutch or brake F. As used herein, the term "clutch" may refer to mechanism for coupling or connecting two rotating components and the term "brake" may refer to a mechanism for coupling or connecting a rotating component to a non-rotating or static component.

The shifting elements of automatic transmission 10 selectively adjust between an open or disengaged configuration and a closed or engaged configuration. In the disengaged configuration, the shifting elements do not engage an associated component of the four planetary gear sets, e.g., and do not or negligibly interfere with rotation of the associated component of the four planetary gear sets relative to the shifting elements. Conversely, in the engaged configuration, the shifting elements engage the associated component of the four planetary gear sets, e.g., and hinder or prevent rotation of the associated component of the four planetary gear sets relative to the shifting elements. As may be seen in FIG. 1, dog clutch A selectively connects or couples input shaft 12 to the sun gear of second planetary gear set 22 and the ring gear of first planetary gear set 20. Multidisc clutch B selectively connects or couples input shaft 12 to the sun gear of first planetary gear set 20. Multidisc brake C selectively connects or couples a transmission housing 16 to the sun gear of first planetary gear set 20. Multidisc brake D selectively connects or couples transmission housing 16 to the ring gear of second planetary gear set 22. Multidisc clutch E selectively connects or couples input shaft 12 to the planet carrier of third planetary gear set 24 and the ring gear of fourth planetary gear set 26. Dog clutch F selectively connects or couples transmission housing 16 to the sun gear of third and fourth planetary gear sets 24, 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Electronic control unit 28 may also include a timer or clock, such as a real-time clock (RTC).

Electronic control unit 28 may be mounted on an exterior of transmission housing 16. Electronic control unit 28 is in operative communication with solenoid valves of the shifting elements of automatic transmission 10. Thus, electronic control unit 28 may selectively adjust the shifting elements between the engaged configuration and the disengaged configuration, e.g., by selectively opening and closing the associated solenoid valves of the shifting elements. In such a manner, electronic control unit 28 may shift automatic transmission 10 between gears during operation of automatic transmission 10, e.g., based at least in part on signals from input speed sensor 30 and output speed sensor 32, as will be understood by those skilled in the art.

Input speed sensor 30 is configured for measuring a speed, e.g., rotations per minute (RPM), of input shaft 12. Input speed sensor 30 may be positioned adjacent input shaft 12 or impeller 44 of torque converter 40. Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

FIG. 2 illustrates a table 200 of an exemplary shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", eighth gear "8", and ninth gear "9". The reverse gear is labeled "R". In table 200, cells filled with "x" indicate the engaged configuration, and cells filled with "--" indicate the disengaged configuration. Thus, e.g., dog clutch A, multidisc brake D and dog clutch F are in the engaged configuration in first gear, and multidisc clutch B, multidisc brake C and multidisc clutch E are in the disengaged configuration in first gear. As another example, dog clutch A, multidisc brake C and dog clutch F are in the engaged configuration in second gear, and multidisc clutch B, multidisc brake D and multidisc clutch E are in the disengaged configuration in second gear. In the fourth gear, dog clutch A, multidisc clutch E and dog clutch F are in the engaged configuration. It should be understood that in certain exemplary embodiments, dog clutch A need not be in the engaged configuration to operate automatic transmission 10 in fourth gear. Thus, multidisc clutch E and dog clutch F may be the only shifting elements of automatic transmission 10 in the engaged configuration to operate automatic transmission 10 in fourth gear, in certain exemplary embodiments.

As discussed above, automatic transmission 10 includes nine forward gears and one reverse gear. Thus, automatic transmission 10 is generally referred to as a "nine-speed automatic transmission." However, it should be understood that automatic transmission 10 is provided by way of example only and that the present subject matter may be used in or with any suitable automatic transmission. Thus, the present subject matter is not intended to be limited to use with automatic transmission 10. As an example, the present subject matter may be used in automatic transmissions having five forward gears, six forward gears, eight forward gears, etc.

Figure 3:
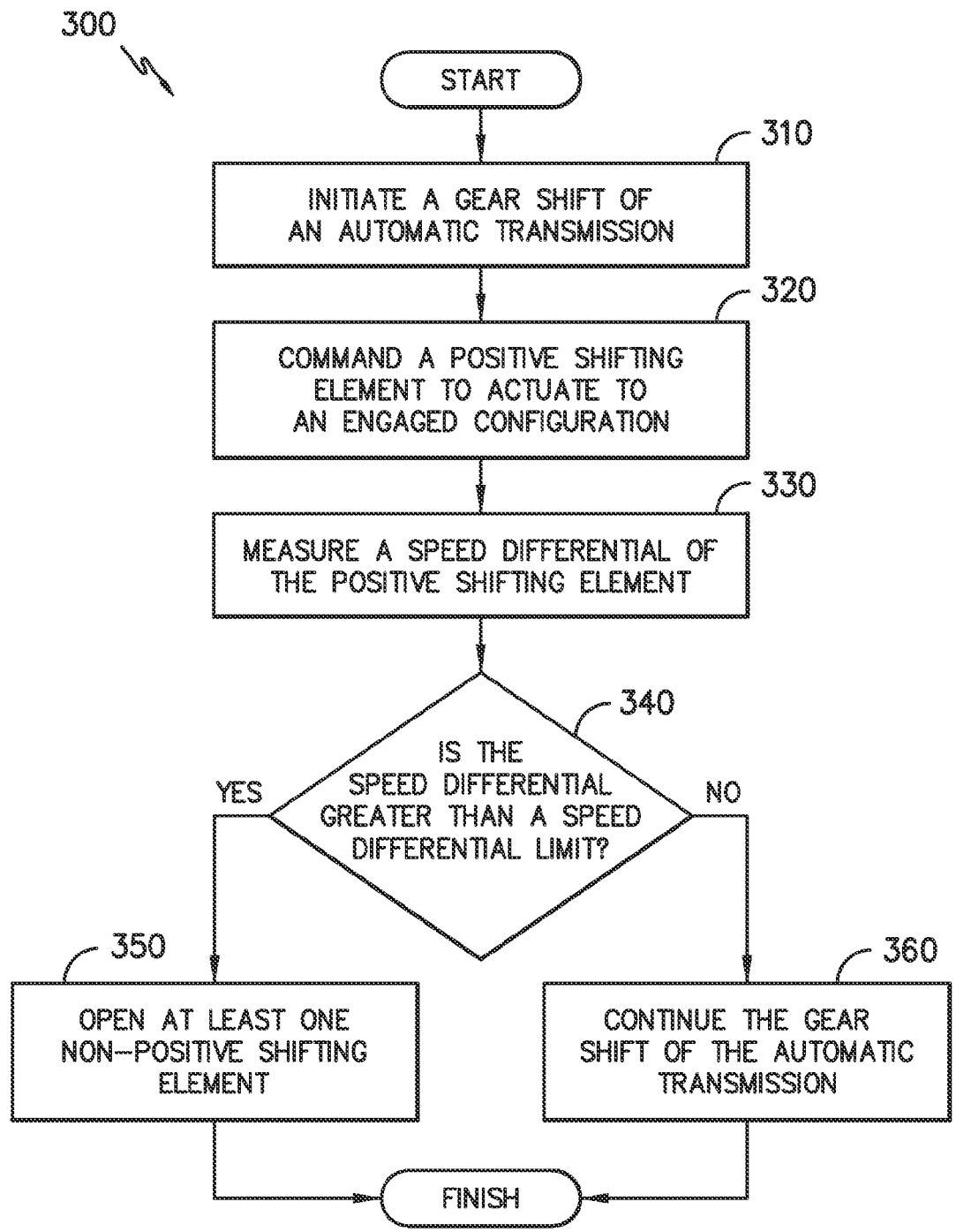
FIG. 3 illustrates a method for operating an automatic transmission according to an exemplary embodiment of the present subject matter.

FIG. 3 illustrates a method 300 for operating an automatic transmission according to an exemplary embodiment of the present subject matter. Method 300 may be used in or with any suitable transmission. For example, method 300 may be used with automatic transmission 10 (FIG. 1). The electronic control unit 28 of automatic transmission 10 may be programmed or configured to implement method 300. Utilizing method 300, at least one non-positive shifting element of automatic transmission 10 is opened if a positive shifting element of automatic transmission 10 does not suitably actuate, e.g., to the engaged configuration. Opening the at least one non-positive shifting element of automatic transmission 10 may shift automatic transmission 10 to an extended neutral gear in order to terminate or interrupt power flow from automatic transmission 10 and protect the positive shifting element of the automatic transmission 10, as discussed in greater detail below.

At step 310, a gear shift of automatic transmission 10 is initiated. For example, automatic transmission 10 may be operated in an initial gear and shifted to a subsequent gear during the gear shift. The initial gear may be any suitable gear of automatic transmission 10. For example, the initial gear may be fifth gear such that dog clutch A, multidisc clutch B and multidisc clutch E are in the engaged configuration at a start of step 310, as may be seen in FIG. 2.

At step 320, a positive shifting element of automatic transmission 10 is commanded to actuate from the disengaged configuration to the engaged configuration. Any suitable positive shifting element of automatic transmission 10, such as dog clutch A or dog clutch F, may be commanded to the engaged configuration at step 320. As an example, electronic control unit 28 may open a solenoid valve of dog clutch F such that a command line pressure supplied to dog clutch F is increased in order to command dog clutch F to adjust to the engaged configuration at step 320. In particular, as discussed above, dog clutch A, multidisc clutch B and multidisc clutch E are in the engaged configuration when automatic transmission 10 is in fifth gear. Conversely, dog clutch A, multidisc clutch E and dog clutch F are in the engaged configuration when automatic transmission 10 is in fourth gear. Thus, electronic control unit 28 may actuate dog clutch F to the engaged configuration at step 320 during a downshift of automatic transmission 10 from fifth gear to fourth gear, e.g., when an associated vehicle is accelerating or climbing uphill.

At step 330, a speed differential of the positive shifting element of automatic transmission 10 is measured, e.g., during step 320. As an example, electronic control unit 28 may receive speed measurements of input shaft 12 and output shaft 14 from input speed sensor 30 and output speed sensor 32, respectively, to measure speed differential of dog clutch F at step 330. In particular, the speed differential of dog clutch F may be zero is the speed of the input shaft 12 measured with input speed sensor 30 is equal to the speed of the output shaft 14 measured with output speed sensor 32. Conversely, the speed differential of dog clutch F is not zero is the speed of the input shaft 12 measured with input speed sensor 30 is not equal to the speed of the output shaft 14 measured with output speed sensor 32.

At step 340, the speed differential of the positive shifting element of automatic transmission 10 is compared to a speed differential limit. The speed differential limit may be any suitable rotational speed difference. For example, the speed differential limit may be three hundred rotations per minute, two hundred rotations per minute, one hundred rotations per minute, etc. If the speed differential is not greater than the speed differential limit at step 340, the gear shift of automatic transmission 10 is continued at step 360. As an example, electronic control unit 28 may actuate dog clutch F to the engaged configuration at step 360, e.g., because dog clutch F may be safely actuated to the engaged configuration, in order to continue the gear shift.

If the speed differential exceeds the speed differential limit at step 340, at least one non-positive shifting element of automatic transmission 10 may be opened or shifted to the disengaged configuration at step 350. Any suitable non-positive shifting element of automatic transmission 10 may be opened at step 350. For example, multidisc clutch B, multidisc brake C, multidisc brake D, multidisc clutch E, or any suitable combination thereof may be opened at step 350. As an example, as shown in FIG. 2, automatic transmission 10 may be shifted to one of the extended neutral gears during step 350. Thus, during a downshift from fifth gear to fourth gear, automatic transmission 10 may be shifted to extended neutral A open, F closed during step 350. Similarly, during a downshift from eight gear to seventh gear, automatic transmission 10 may be shifted to extended neutral A/F open during step 350.

Automatic transmission 10 does not deliver power to output shaft 14 of automatic transmission 10 at step 350. Thus, by opening the at least one non-positive shifting element of automatic transmission 10 at step 350, the power output of automatic transmission 10 is interrupted or terminated. In such a manner, method 300 may protect dog clutch F, e.g., by hindering or preventing grinding of dog clutch F when the speed differential exceeds the speed differential limit at step 340.

Method 300 may also include determining or establishing a position of the positive shifting element of automatic transmission 10, e.g., after step 350. Any suitable method or mechanism may be used to determine or establish the position of the positive shifting element of automatic transmission 10. As an example, electronic control unit 28 may utilize the method described in U.S. Pat. No. 8,812,200 of Novak, which is hereby incorporated by reference for all purposes, to determine the position of dog clutch F after step 350. As another example, electronic control unit 28 may utilize a pressure difference across an actuating piston of the dog clutch F to determine the position of dog clutch F after step 350, as will be understood by those skilled in the art. In particular, a signal from a pressure valve of dog clutch F may change when dog clutch F actuates between the engaged configuration and the disengaged configuration. The at least one non-positive shifting element of automatic transmission 10 is closed if the position of the positive shifting element is the engaged configuration. Thus, automatic transmission 10 may be shifted out of the extended neutral gear once the positive shifting element is actuated to the engaged configuration.

Figure 4:
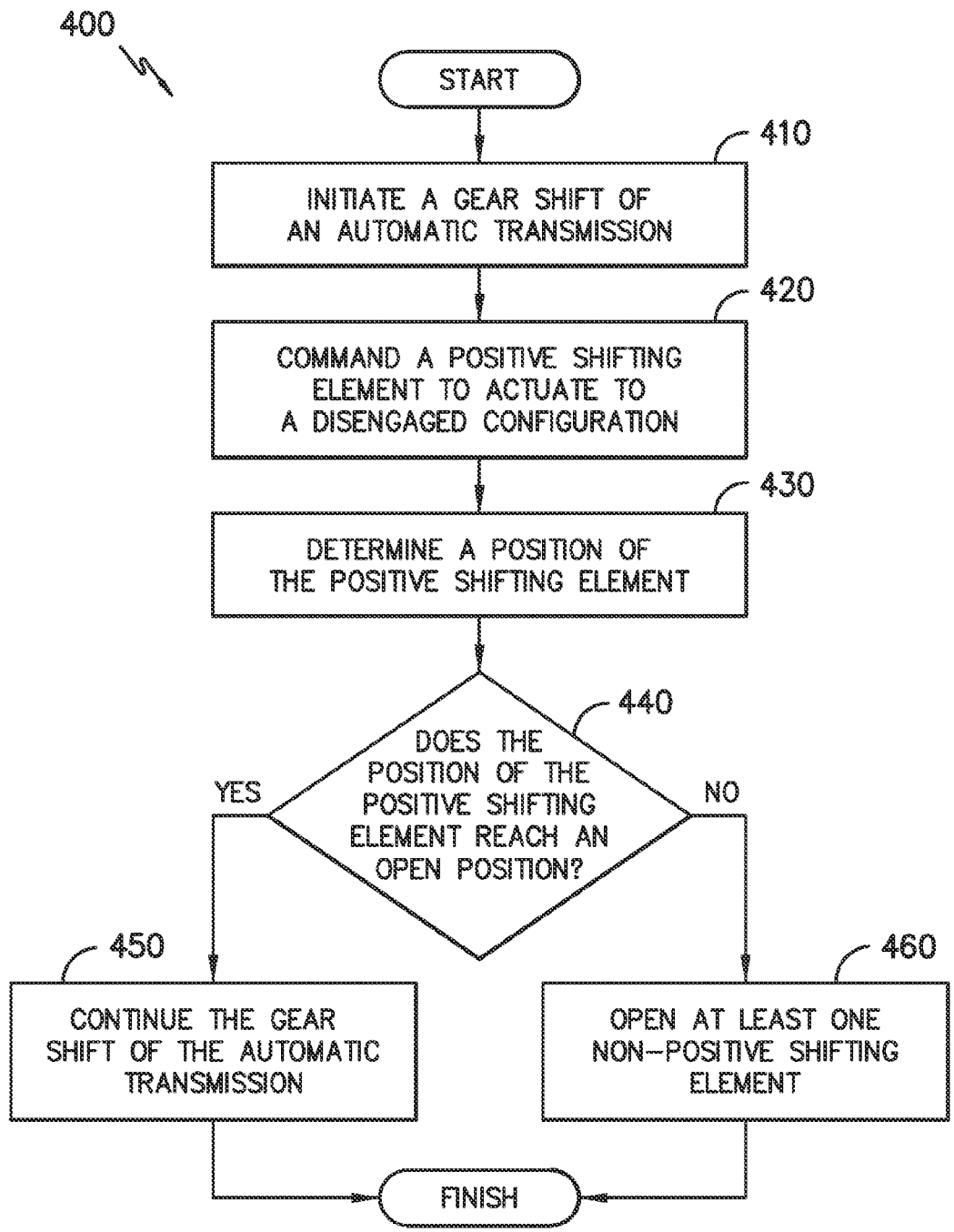
FIG. 4 illustrates a method for operating an automatic transmission according to another exemplary embodiment of the present subject matter.

FIG. 4 illustrates a method 400 for operating an automatic transmission according to another exemplary embodiment of the present subject matter. Method 400 may be used in or with any suitable transmission. For example, method 400 may be used with automatic transmission 10 (FIG. 1). The electronic control unit 28 of automatic transmission 10 may be programmed or configured to implement method 400. Utilizing method 400, at least one non-positive shifting element of automatic transmission 10 is opened if a positive shifting element of automatic transmission 10 does not suitably actuate, e.g., to the disengaged configuration. Opening the at least one non-positive shifting element of automatic transmission 10 may shift automatic transmission 10 to an extended neutral gear in order to terminate or interrupt power flow from automatic transmission 10 and protect the positive shifting element of the automatic transmission 10, as discussed in greater detail below.

At step 410, a gear shift of automatic transmission 10 is initiated. For example, automatic transmission 10 may be operated in an initial gear and shifted to a subsequent gear during the gear shift. The initial gear may be any suitable gear of automatic transmission 10. For example, the initial gear may be fourth gear such that dog clutch A, multidisc clutch B and dog clutch F are in the engaged configuration at a start of step 410, as may be seen in FIG. 2.

At step 420, a positive shifting element of automatic transmission 10 is commanded to actuate from the engaged configuration to the disengaged configuration. Any suitable positive shifting element of automatic transmission 10, such as dog clutch A or dog clutch F, may be commanded to the disengaged configuration at step 420. As an example, electronic control unit 28 may close the solenoid valve of dog clutch F such that a command line pressure supplied to dog clutch F decreases in order to command dog clutch F to adjust to the disengaged configuration at step 420. In particular, as discussed above, dog clutch A, multidisc clutch B and dog clutch F are in the engaged configuration when automatic transmission 10 is in fourth gear. Conversely, dog clutch A, multidisc clutch B and multidisc clutch E are in the engaged configuration when automatic transmission 10 is in fifth gear. Thus, electronic control unit 28 may actuate dog clutch F to the disengaged configuration at step 420 during a upshift of automatic transmission 10 from fourth gear to fifth gear, e.g., when an associated vehicle is moving downhill.

At step 430, a position of the positive shifting element of automatic transmission 10 is determined or established, e.g., after step 420. Any suitable method or mechanism may be used to determine or establish the position of the positive shifting element of automatic transmission 10, as discussed above. At step 430, the position of the positive shifting element of automatic transmission 10 may be established as the engaged configuration, the disengaged configuration or an intermediate configuration, which corresponds to a position between the engaged configuration and the disengaged configuration.

At step 440, electronic control unit 28 determines whether the position of the positive shifting element of automatic transmission 10 from step 430 is an open position, such as the disengaged configuration. If the position of the positive shifting element from step 430 is the open position at step 440, the gear shift of automatic transmission 10 is continued at step 450. As an example, electronic control unit 28 may actuate multidisc clutch B and multidisc clutch E to the engaged configuration at step 450 in order to continue the gear shift, e.g., because dog clutch F is in the disengaged configuration.

If the position of the positive shifting element from step 430 is not the open position at step 440, at least one non-positive shifting element of automatic transmission 10 may be opened or shifted to the disengaged configuration at step 460. Any suitable non-positive shifting element of automatic transmission 10 may be opened at step 460. For example, multidisc clutch B, multidisc brake C, multidisc brake D, multidisc clutch E, or any suitable combination thereof may be opened at step 460. As an example, as shown in FIG. 2, automatic transmission 10 may be shifted to one of the extended neutral gears during step 460. Thus, during an upshift from fourth gear to fifth gear, automatic transmission 10 may be shifted to extended neutral A/F closed during step 460.

Automatic transmission 10 does not deliver power to output shaft 14 of automatic transmission 10 at step 460. Thus, by opening the at least one non-positive shifting element of automatic transmission 10 at step 460, the power output of automatic transmission 10 is interrupted or terminated. In such a manner, method 400 may protect dog clutch F, e.g., by hindering or preventing overdetermining of automatic transmission 10 when dog clutch F is stuck in the engaged configuration.

Method 400 may further include determining an elapsed time during step 430. For example, after the positive shifting element is commanded to the engaged configuration at step 420, the timer of electronic control unit 28 may measure or track an elapsed time until the positive shifting element shifts to the engaged configuration. If the elapsed time exceeds a predetermined time limit during step 430, electronic control unit 28 may determine that the position of the positive shifting element from step 430 is not the open position at step 440. Thus, step 430 may continue for the predetermined time limit or until the positive shifting element adjusts to the engaged configuration.

Method 400 may also include determining or establishing the position of the positive shifting element of automatic transmission 10, e.g., after step 460. Any suitable method or mechanism may be used to determine or establish the position of the positive shifting element of automatic transmission 10, as discussed above. The at least one non-positive shifting element of automatic transmission 10 is open if the position of the positive shifting element is the disengaged configuration after step 460. Thus, automatic transmission 10 may be shifted out of the extended neutral gear once the positive shifting element is actuated to the disengaged configuration.

Opening at least one non-positive shifting element of automatic transmission 10 may also assist with providing rapid power delivery when an associated vehicle of automatic transmission 10 is operating in an engine start-stop mode. For example, when the associated vehicle stops and the engine is turned off, the power output of automatic transmission 10 may be interrupted or terminated by opening the at least one non-positive shifting element of automatic transmission 10. When the engine is subsequently turned on, only the at least one non-positive shifting element of automatic transmission 10 is reengaged in order to resume power delivery from of automatic transmission 10. Thus, automatic transmission 10 may be shifted to one of the extended neutral gears when the engine is deactivated in the engine start-stop mode, and automatic transmission 10 may be shifted out of the extended neutral gears when the engine is activated in the engine start-stop mode.

As an example, when the motor of the associated vehicle is deactivated, all of multidisc clutch B, multidisc brake C, multidisc brake D, multidisc clutch E may be actuated to the disengaged configuration. Conversely, dog clutch A and dog clutch F may remain in the engaged configuration when the motor of the associated vehicle is deactivated. When a user of the associated vehicle presses a gas pedal of the associated vehicle or otherwise activates the motor of the associated vehicle, multidisc brake D may be actuated to the engaged configuration in order to place automatic transmission 10 in first gear, as shown in FIG. 2. In such a manner, time consuming synchronization and engagement of dog clutch A and dog clutch F may be avoided when the associated vehicle is operating in the engine start-stop mode and the motor of the associated vehicle is activated, and the associated vehicle of automatic transmission 10 may be operated in the engine start-stop mode without delays and lags associated with synchronization and engagement of dog clutch A and dog clutch F each time the associated vehicle is stopped.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an automatic transmission, the automatic transmission having a plurality of non-positive shifting elements and at least one positive shifting element, the method comprising:

commanding a first one of the at least one positive shifting element to actuate from an engaged configuration to a disengaged configuration;

determining a position of the first one of the at least one positive shifting element during said step of commanding; and opening at least one non-positive shifting element of the plurality of non-positive shifting elements if the position of the first one of the at least one positive shifting element does not reach an open position during said step of determining.

2. The method of claim 1, wherein said step of commanding comprises commanding the first one of the at least one positive shifting element to actuate from the engaged configuration to the disengaged configuration during an engine stop.

3. The method of claim 1, wherein the first one of the at least one positive shifting element is a dog clutch.

4. The method of claim 3, wherein said step of determining comprises receiving a signal from a pressure valve, the signal from the pressure valve changing when the dog clutch actuates to the engaged configuration.

5. The method of claim 1, wherein said step of opening comprises opening a first one and a second one of the plurality of non-positive shifting elements if the position of the first one of the at least one positive shifting element does not reach the open position during said step of determining.

6. The method of claim 1, wherein further comprising:

establishing the position of the first one of the at least one positive shifting element after said step of opening; and closing the at least one non-positive shifting element of the plurality of non-positive shifting elements if the position of the first one of the at least one positive shifting element is an engaged configuration at said step of establishing.

7. The method of claim 1, wherein the automatic transmission does not deliver power to an output shaft of the automatic transmission at said step of opening.

8. The method of claim 1, wherein the plurality of non-positive shifting elements are friction shifting elements.

9. The method of claim 1, wherein the first one of the at least one positive shifting element is sticking at said step of opening.

10. A method for operating an automatic transmission in a start-stop mode, the automatic transmission having a plurality of non-positive shifting elements and at least one positive shifting element, the method comprising:

deactivating an engine of a vehicle when the vehicle comes to a stop;

opening at least one non-positive shifting element of the plurality of non-positive shifting elements at said step of deactivating;

keeping the at least one positive shifting element in an engaged configuration during said step of deactivating;

activating the engine of the vehicle after said step of deactivating; and closing the at least one non-positive shifting element of the plurality of non-positive shifting elements at said step of activating.

* * * * *